(12) United States Patent
Stong et al.

(10) Patent No.: US 10,077,737 B2
(45) Date of Patent: Sep. 18, 2018

(54) PISTON WITH COATED PIN BORE

(71) Applicant: Mahle International GmbH, Stuttgart (DE)

(72) Inventors: Thomas Stong, Kent City, MI (US); Thomas J. Smith, Muskegon, MI (US)

(73) Assignee: Mahel International GmbH (DE)

(*) Notice: Subject to any disclaimer, the term of this patent is extended or adjusted under 35 U.S.C. 154(b) by 788 days.

(21) Appl. No.: 14/608,396

(22) Filed: Jan. 29, 2015

(65) Prior Publication Data
US 2015/0211437 A1 Jul. 30, 2015

Related U.S. Application Data

(60) Provisional application No. 61/965,400, filed on Jan. 29, 2014.

(51) Int. Cl.
| | | |
|---|---|---|
| *F02F 3/28* | (2006.01) | |
| *F02F 3/14* | (2006.01) | |
| *C23C 4/08* | (2016.01) | |
| *C23C 4/131* | (2016.01) | |

(52) U.S. Cl.
CPC .............. *F02F 3/14* (2013.01); *C23C 4/08* (2013.01); *C23C 4/131* (2016.01); *F02F 3/28* (2013.01); *F16C 2223/42* (2013.01); *F16C 2226/34* (2013.01)

(58) Field of Classification Search
CPC .... F02F 3/14; F02F 3/28; C23C 4/131; C23C 4/08; F16C 223/42; F16J 1/02; F16J 1/16
See application file for complete search history.

(56) References Cited

U.S. PATENT DOCUMENTS

| | | | |
|---|---|---|---|
| 7,296,610 B2 | 11/2007 | Zaluzec et al. | |
| 8,893,580 B2 | 11/2014 | Domanchuk et al. | |
| 2004/0216605 A1* | 11/2004 | Nigro | F16J 1/16 92/208 |
| 2014/0109861 A1* | 4/2014 | Korner | F02F 3/10 123/193.4 |
| 2014/0186540 A1* | 7/2014 | Schramm | B05B 7/22 427/449 |

FOREIGN PATENT DOCUMENTS

CN    102517536 A    6/2012

OTHER PUBLICATIONS

English Abstract for CN102517536A.

* cited by examiner

*Primary Examiner* — F. Daniel Lopez
*Assistant Examiner* — Abiy Teka
(74) *Attorney, Agent, or Firm* — Fishman Stewart PLLC

(57) ABSTRACT

Exemplary pistons and methods are disclosed. A method may include depositing a scuff and seizure resistant material via a thermal spray method on the surface of a piston pin bore used in internal combustion engines. Exemplary pistons may have a crown and a skirt. The piston crown may define a combustion bowl and a ring land extending circumferentially around the combustion bowl, the skirt supporting the crown, the skirt including a pair of pin bosses, the pin bosses each defining a pin bore configured to receive a piston pin, each pin bore defining a pin bore surface extending circumferentially about the piston pin bore, the bore surface formed of a first material. The method may further include applying a coating comprising at least a second material different from the first material to the pin bore surfaces using a thermal spray process.

16 Claims, 4 Drawing Sheets

PISTON WITH COATED PIN BORE

CROSS-REFERENCE TO RELATED APPLICATION

The application claims priority to U.S. Provisional Application Ser. No. 61/965,400, filed on Jan. 29, 2014, the contents of which are hereby expressly incorporated by reference in their entirety.

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency also may also result in an increase in pressure and/or temperature within the combustion chamber during operation.

Plasma coating process may be used to coat bearing surfaces in internal combustion engines with an alloy by carrying out arc wire spraying. Known arc wire spraying processes include a twin-wire arc spray (TWAS) process, in which two wires are fed to a spray head in such a manner that the electric current is transmitted across the wires. In other examples, a plasma transferred wire arc (PTWA) process may be employed. A PTWA method generally establishes an operating plasma in which a cathode is provided, and a free end of a single consumable wire is melted such that a stream of molten metal particles is continuously fed and projected onto the target surface.

In many extremely demanding applications, present-day internal combustion pistons are made from steel. Pin bore surfaces may tend to scuff as a result of metal to metal contact within the pin bore and the piston pin system. Insufficient lubrication volume and high operating stresses are a direct cause of surface scuffing.

The lack of sufficient lubrication and high service loads on engine parts combine to create extremely high stresses on those parts. Materials that provide better scuff resistance, e.g., than steel, would be desired to extend the service life of the engine. Accordingly, in some applications bushings are provided as an interface between pin bore surfaces and the piston pin. However, such bushings add cost, complexity, and weight to the piston assembly.

Accordingly, there is a need for a piston that addresses the above problems.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
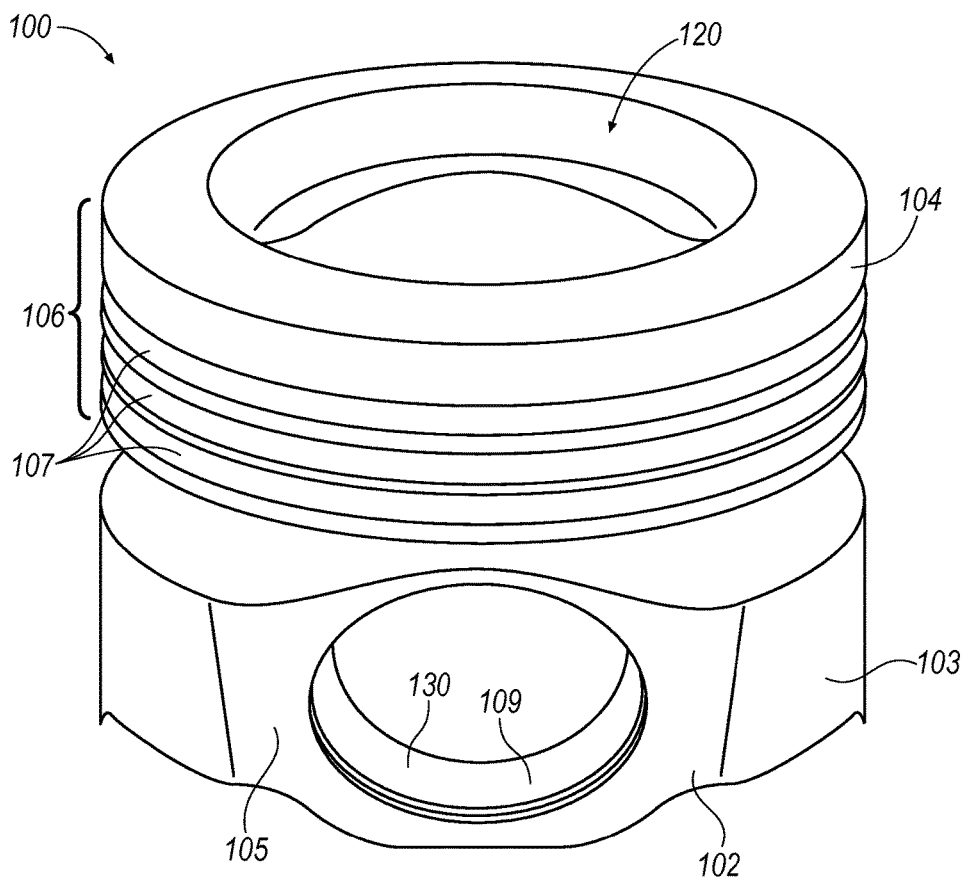
FIG. 1 is a perspective view of a piston, according to an exemplary illustration.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Exemplary methods are disclosed herein, which may include providing a piston having a crown and a skirt. The piston crown may define a combustion bowl and a ring land extending circumferentially around the combustion bowl, the skirt supporting the crown, the skirt including a pair of pin bosses, the pin bosses each defining a pin bore configured to receive a piston pin, each pin bore defining a pin bore surface extending circumferentially about the piston pin bore, the bore surface formed of a first material. The method may further include applying a coating comprising at least a second material different from the first material to the pin bore surfaces using a thermal spray process.

Exemplary illustrations are also directed to piston, which may include a crown defining a combustion bowl and a ring land extending circumferentially around the combustion bowl, and a skirt supporting the crown. The skirt may include a pair of pin bosses, the pin bosses each defining a pin bore configured to receive a piston pin, each pin bore defining a pin bore surface extending circumferentially about the piston pin bore, the bore surface formed of a first material. The piston may further include a coating adhered to the pin bore surfaces, the coating comprising a second material.

Exemplary systems disclosed herein may include a piston, e.g., a piston described above. The exemplary system may further include a wire comprising at least a second material. The wire may be used to form a coating adhered to the pin bore surfaces by a thermal spray process, e.g., in a PTWA process.

Exemplary methods may generally provide pin bores on pistons used in internal combustion engines with an increased resistance to scuffing and seizure during normal engine operation. The material applied to a bearing surface using single wire plasma transferred wire arc (PTWA) technology may generally be superior in seizure and scuff resistance compared to the base metal traditionally used in cast or forged pistons used in diesel and gasoline powered internal combustion engines.

A plasma transferred wire arc (PTWA) process is a thermal spray process which melts a continuously advancing feedstock material, e.g., usually in the form of a metal wire or rod, by using a constricted plasma-arc to melt only the tip of the wire or rod (connected as an anodic electrode). The melted particles are thereby propelled to a target surface. The plasma may be a high velocity jet of ionized gas which is desirably constricted and focused about a linear axis by passing it through a nozzle orifice downstream of a cathode electrode. The high current arc, which may be struck between the cathode electrode and the anodic nozzle, may be transferred to the wire tip maintained also as an anode. Alternatively, the high current arc can be transferred directly to the wire tip.

The resulting coating applied to the target surface via the PTWA process may be essentially the same material that composes the feedstock wire. The feedstock wire can be composed of almost any material that is capable of being melted and accelerated via a forced gas stream. In some examples, a wire having a single material or generally homogeneous composition may be employed. In other exemplary approaches, a wire may be used which has multiple materials. For example, a wire may be used which has a first material arranged in a sheath that generally surrounds a filler material disposed within the sheath.

Figure 2:
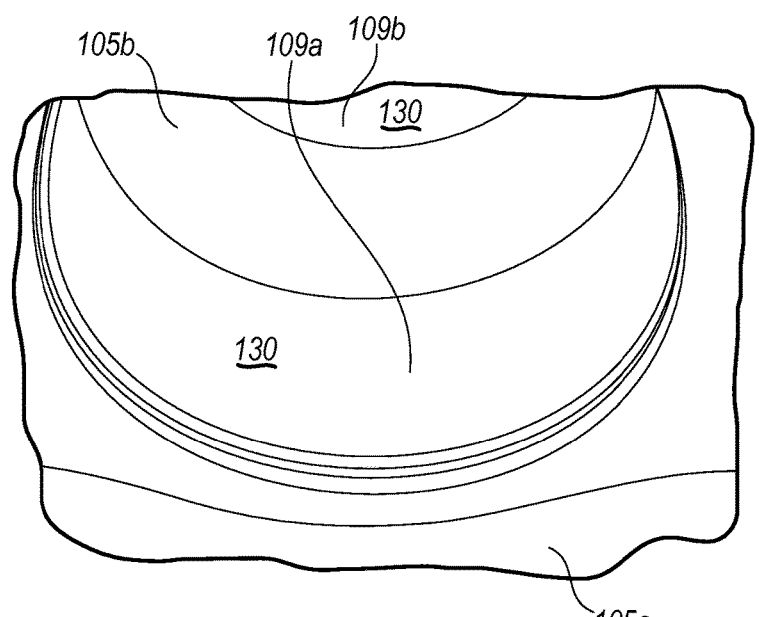
FIG. 2 is an enlarged view of the exemplary piston of FIG. 1.

Turning now to FIGS. 1 and 2, an exemplary piston 100 is illustrated. Piston 100 may include a piston skirt 102 and a crown 104. In some examples, the piston 100 may be formed in a single piece, e.g., by forging or casting. In other examples, as will be further described below, the crown 104 and skirt 102 may be initially formed as separate components and then joined together.

The skirt 102 and/or crown 104 may define a combustion bowl 120. The crown 104 may include a ring belt portion 106 that is configured to seal against an engine bore (not shown) receiving the piston 100. For example, the ring belt portion 106 may define one or more circumferential grooves 107 that receive piston rings (not shown), which in turn seal against engine bore surfaces during reciprocal motion of the piston 100 within the engine bore.

The skirt 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The skirt 102 may also define piston pin bosses 105. The piston pin bosses 105 may generally be formed with apertures or pin bores 109 configured to receive a piston pin (not shown). For example, a piston pin may be inserted through the pin bores 109 in the piston pin bosses 105, thereby generally securing the piston 100 to a connecting rod (not shown). Features of the piston 100, e.g., the ring grooves 107, pin bosses 105 and/or the pin bores 109 formed therein, may be provided by being formed integrally as part of the same process used to form the skirt 102 and/or crown 104, e.g., casting, forging, or the like. Alternatively, they may be formed subsequently, e.g., by machining, punching, or other material removal processes. As will be described further below, a coating 130 may be applied on the pin bores 109. The pin bore surfaces 109 may be prepared prior to application of the coating 130, e.g., by machining, honing, or creating a desired surface roughness of the pin bore 109 prior to application of the coating 130. Such preparation may promote a bond between the coating 130 to the pin bore 109.

In exemplary approaches where the skirt 102 and crown 104 are initially formed as separate parts and subsequently joined together, the skirt 102 and body 104 may be joined such that upper surfaces of the skirt 102 define in part a lower portion of the combustion bowl. More specifically, the crown 104 may initially be formed in a ring shape which receives the skirt 102 therein. Alternatively, the crown 104 and skirt 102 may be joined via joining surfaces disposed entirely beneath the combustion bowl 120, such that the combustion bowl is formed by the crown 104 alone.

The skirt 102 and crown 104 may be fixedly joined in any process that is convenient. Merely as examples, the skirt 102 and crown 104 may be joined in a friction welding, laser welding, or brazing process. By fixedly joining the skirt 102 and crown 104, the piston 100 may be generally formed as a one-piece assembly.

The piston skirt 102 and crown 104 may be constructed from any materials that are convenient. In examples where the skirt and crown are friction or laser welded together, the materials of each may be susceptible to being friction or laser welded, respectively. In one exemplary illustration, the skirt 102 and crown 104 are formed of different materials. Accordingly, a material used for each component may be more closely matched with the general requirements and operating conditions relevant to each. Piston skirt 102 may, merely as examples, include different mechanical properties, e.g., yield point, tensile strength or notch toughness, than the crown 104. Any material or combination may be employed for the skirt 102 and crown 104 that is convenient. Merely as examples, the skirt 102 and/or crown 104 may be formed of a steel material, cast iron, aluminum material, composite, or powdered metal material. Additionally, any forming processes that are convenient may be used for the skirt 102 and crown 104. Any material and/or forming combination may be employed that is convenient.

Figure 4:
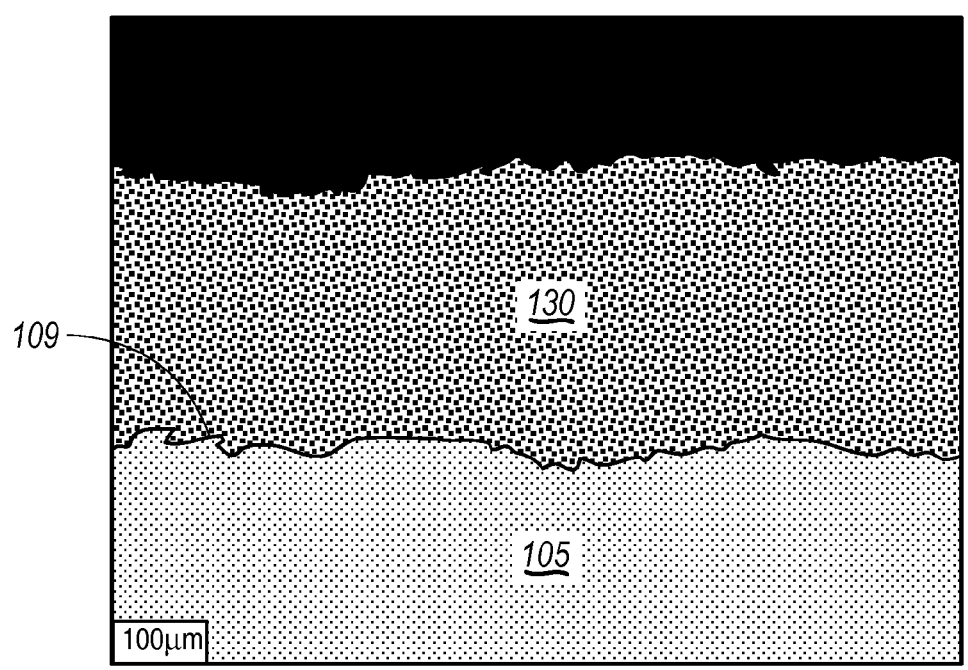
FIG. 4 is an enlarged section view of a piston pin bore surface after a coating has been applied, according to one exemplary approach.

As noted above, a pin bore coating 130 may be applied to the inner surface of the pin bores 109. As will be described further below, the coating 130 may be applied using a thermal spray process, e.g., a PTWA process where the coating 130 is applied by way of a wire (not shown in FIGS. 1 and 2) fed into a thermal spray process. The coating 130 may thereby be adhered to the pin bore surfaces 109 generally permanently. For example, as shown in FIG. 4 an exemplary coating 130 may form a generally permanent layer that is adhered to the base material of the pin boss 105 and/or pin bore 109. Additionally, the coating 130 substantially fills in surface roughness of the pin bore surface 109 as shown in FIG. 4. The coating 130 may be formed of a different material than that of the pin boss 105 and/or pin bore 109. The material of the coating 130 may provide increased scuff resistance compared with the base material forming the pin boss 105 and/or pin bore 109, thereby improving performance with regard to friction between the piston pin and the pin bore 109.

Exemplary pistons 100 may be employed in small and large bore diameter applications, generally without limitation. Additionally, exemplary pistons 100 may be used in any fuel application that is convenient, including diesel, natural gas, gasoline, ethanol, and oil fuel applications typical of heavy duty marine applications.

Figure 3A:
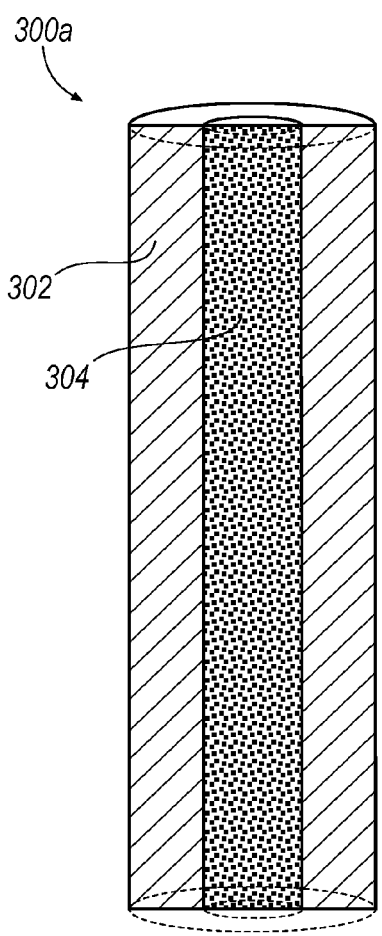
FIG. 3A is a partial section view of an exemplary wire with a solid outer sheath having a hollow center filled with a second metal component, according to an exemplary illustration.
Figure 3B:
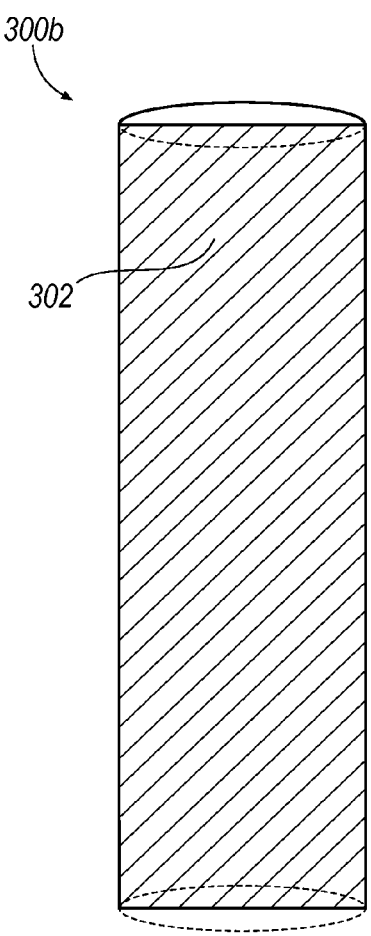
FIG. 3B is a partial section view of another exemplary wire used in a coating process, where the wire is a solid wire formed of a single material, according to an exemplary illustration.

Turning now to FIGS. 3A and 3B, exemplary wires that may be employed in a coating process, e.g., a PTWA process, are illustrated. Exemplary coatings 130 formed using wires 300 may generally have substantially the same composition as the wires 300. For example, the coating 130 (e.g., as shown in FIG. 4) will generally have a composition of 90% copper and 10% tin where the wire 300 (e.g., as shown in FIG. 3B) used to form the coating 130 had a composition of 90% copper and 10% tin.

Wires may be formed of a single material, e.g., as shown in a wire 300b in FIG. 3B. In such examples, the individual elements in the alloy wire may be completely homogenized in a plasma stream used to apply the coating. Accordingly, a consistent and uniform chemistry of the deposited material may be achieved.

In other examples, the wire 300 may comprise multiple layers or material compositions. For example, as best seen in FIG. 3A, a wire 300a may have a first material 302 provided in a sleeve or sheath surrounding a second material 304. Merely as examples, the first material 302 may comprise a copper and aluminum alloy that defines a hollow cavity in the middle of the wire alloy strand. In one example, the composition of the first material 302 is a copper alloy, e.g., a copper-aluminum alloy, a copper-tin alloy, or a copper-zinc alloy. Exemplary alloy ratios may be a range of 50% to 90% copper and 50% to 10% aluminum in examples where the first material 302 includes a copper aluminum alloy. In examples where the first material 302 comprises a copper tin alloy, the ratio of metals may be a range of 90% to 96% copper and 10% to 4% tin.

The filler material 304 may comprise a mixture of various metal materials comprised of, but not limited to, carbides of the following metals: copper, aluminum, tin, chromium, tungsten, titanium, molybdenum and nickel. In other examples, the second material 304 may comprise alloys of the following metals: copper, aluminum, tin, chromium, tungsten, titanium, molybdenum and nickel.

In some examples, additional materials may be combined with the wire 300 during a plasma application process, e.g., PTWA. For example, metals comprised of, but not limited to, copper, aluminum, tin, chromium, tungsten, titanium, molybdenum and nickel may be added to the composition of the wire during an exemplary plasma process.

Figure 5:
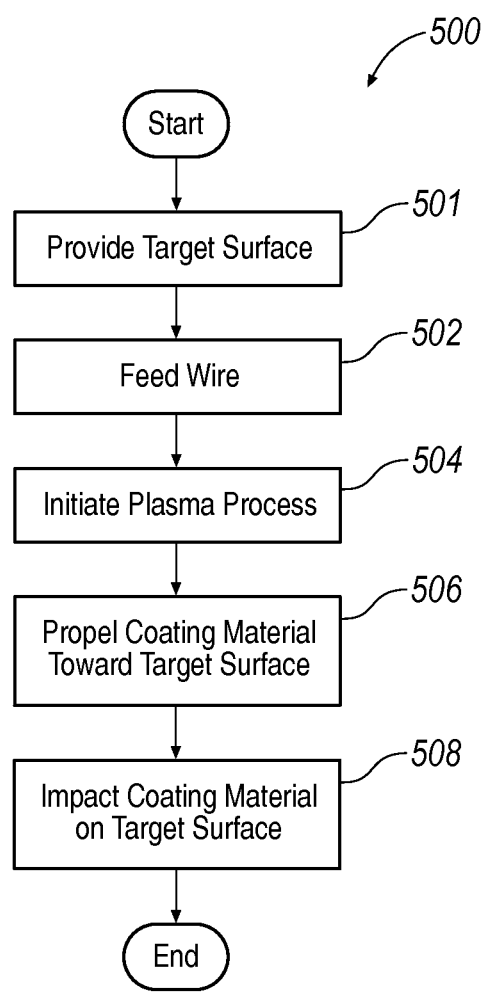
FIG. 5 illustrates a process flow diagram for an exemplary method.

Turning now to FIG. 5, an exemplary process 500 is illustrated. Process 500 may be used to coat a sliding surface, for example a piston pin bore 109. A thermal spraying process, e.g., plasma spraying, may be employed to coat the pin bore surface of the piston, which itself may be produced or cast from aluminum or iron, with an alloy material.

Process 500 may begin at block 501, where a target surface is established or provided. For example, as described above a piston 100 may be provided having a pin bore 109. As noted above, the piston 100 may be formed in any manner that is convenient. In some examples, the piston 100 may be formed in a single piece, e.g., by forging or casting; in other examples, the crown 104 and skirt 102 may be initially formed as separate components and then joined together. Moreover, the crown 104 and skirt 102 may be formed of any material that is convenient. In one example, the piston 100 and the pin bore surface 109 may be formed of a first material. The first material of the piston 100 and/or pin bore 109 may be, merely as examples, a steel material, a cast iron, an aluminum material, a composite, or a powdered metal material. The pin bore 109 may be coated, either in its entirety or along a portion thereof, with a second material different from the first material using exemplary coating methods described herein. The surface of the pin bore 109 may be prepared for coating, e.g., by machining, honing, or otherwise providing a desired surface roughness to promote adhesion of a coating 130 to the pin bore 109. Process 500 may then proceed to block 502.

At block 502, an exemplary wire may be fed into a plasma. For example, a wire 300a, 300b may be fed into a device designed to create a plasma configured to melt an end of the wire 300a, 300b. In addition to the plasma, a carrier gas may be introduced into the plasma stream at a high pressure. Process 500 may then proceed to block 504.

At block 504, an ionization or plasma process is started or driven by a high voltage discharge which ionizes the plasma gas between the alloy wire, a nozzle body, and a cathode. The plasma produced may flow at high velocity through the plasma nozzle. In one example, the plasma gas is transported to the continuously fed alloy wire 300, e.g., perpendicular to the nozzle, whereby the electrical circuit is closed. Process 500 may then proceed to block 506.

At block 506 the carrier gas may accelerate ionized metal produced from the alloy wire toward the target surface, e.g., a pin bore of a piston to be coated. The wire 300 may be Proceeding to block 508, the accelerated metal ions impact the target surface, e.g., a piston pin bore, and are mechanically bonded to the target surface via plastic deformation. The rapid deceleration of the metal particles striking the target surface convert kinetic energy of the particles to thermal energy. This released energy provides the energy required to plastically deform the particles, thereby bonding the particles to the target surface. Accordingly, the particles adhere to the pin bore surface, creating a coating 130 on the pin bore surface.

It may be advantageous to coat the piston pin bores by means of the wire arc deposition spraying process which produces a coating that has a greater resistance to corrosion than a steel or cast iron material, thus increasing the service life of the engine as compared with conventional linings (e.g., composed of gray cast iron alloys). Moreover, exemplary coatings 130 have been found to be substantially more wear and scuff resistant than not only the base materials typically used to form the piston pin boss 105 and pin bore 109, but also bushing materials having material compositions similar to that of the applied coatings. In one example, volume loss of the coating material 130 applied using a PTWA process during a given wear test was more than forty (40) times less than that of a bearing having an identical material composition. Accordingly, exemplary thermal spray coating processes unexpectedly improved performance of the material.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of applying a coating to a piston pin bore, wherein the piston includes a crown and a skirt, the crown defining a combustion bowl and a ring land extending circumferentially around the combustion bowl, the skirt supporting the crown, the skirt including a pair of pin bosses, the pin bosses each defining a pin bore, each pin bore defining a pin bore surface extending circumferentially about the piston pin bore, the method comprising:
   establishing the pin bore surface as a target surface, the pin bore surface formed of a first material; and
   applying the coating to the target surface using a thermal spray process, the coating comprising at least a second material different from the first material;
   wherein the second material is applied with two separate material compositions, the two separate material compositions comprising:
   a first material composition that includes one of only a copper-aluminum alloy, only a copper-tin alloy, and only a copper-zinc alloy; and
   a second material composition that includes one of chromium, tungsten, titanium, molybdenum and nickel.

2. The method of claim 1, wherein applying the coating includes adhering to the pin bore surface using a plasma transfer wire arc process.

3. The method of claim 1, wherein applying the coating includes feeding a wire comprising the second material into a thermal spray.

4. The method of claim 3, wherein the thermal spray comprises a plasma spray.

5. The method of claim 3, wherein feeding the wire into the thermal spray comprises propelling particles of the second material from an end of the wire toward the pin bore surfaces.

6. The method of claim 5, wherein applying the coating includes impacting the particles of the second material with the pin bore surfaces.

7. The method of claim 6, further comprising adhering the particles to the pin bore surfaces by converting kinetic energy associated with the particles into thermal energy.

8. The method of claim 1, wherein the second material includes a ratio of copper to aluminum with a range of 50% to 90% copper and a range of 50% to 10% aluminum.

9. The method of claim 1, wherein the second material includes a ratio of copper to tin with a range of 90% to 96% copper and 10% to 4% tin.

10. A piston, comprising:
    a crown defining a combustion bowl and a ring land extending circumferentially around the combustion bowl;
    a skirt supporting the crown, the skirt including a pair of pin bosses, the pin bosses each defining a pin bore, each pin bore defining a pin bore surface extending circumferentially about the piston pin bore, the pin bore surfaces formed of a first material; and
    a coating adhered to the pin bore surfaces, the coating comprising a second material that includes two material compositions, the two material compositions comprising;
    a first material composition that includes one of only a copper-aluminum alloy, only a copper-tin alloy, and only a copper-zinc alloy; and
    a second material composition that includes at least one of chromium, tungsten, titanium, molybdenum and nickel.

11. The piston of claim 10, wherein the coating is adhered to the bore surface using a plasma transfer wire arc process.

12. The piston of claim 10, wherein the two material compositions include a ratio of copper to aluminum with a range of 50% to 90% copper and 50% to 10% aluminum.

13. The piston of claim 10, wherein the two material compositions include a ratio of copper to tin with a range of 90% to 96% copper and 10% to 4% tin.

14. A system, comprising:
    a piston, including:
        a crown defining a combustion bowl and a ring land extending circumferentially around the combustion bowl; and
        a skirt supporting the crown, the skirt including a pair of pin bosses, the pin bosses each defining a pin bore configured to receive a piston pin, each pin bore defining a pin bore surface extending circumferentially about the piston pin bore, the bore surface formed of a first material; and
    a wire comprising at least a second material, the wire configured to form a coating adhered to the pin bore surfaces by a thermal spray process;
    wherein:
        the wire comprises the second material forming a sleeve surrounding a third material disposed therein;
        the second material of the wire comprises one of only a copper-aluminum and only a copper-tin alloy; and
        the third material of the wire comprises at least one of chromium, tungsten, titanium, molybdenum and nickel.

15. The piston of claim 14, wherein the second material includes a ratio of copper to aluminum with a range of 50% to 90% copper and 50% to 10% aluminum.

16. The piston of claim 14, wherein the second material includes a ratio of copper to tin with a range of 90% to 96% copper and 10% to 4% tin.

* * * * *